3,174,985
AMINE SALT OF A QUATERNARY AMMONIUM-CONTAINING ACID

Alfred Berger, Basel, Switzerland, assignor to Ciba Limited, Basel, Switzerland, a company of Switzerland
No Drawing. Filed Oct. 25, 1962, Ser. No. 233,150
Claims priority, application Switzerland, Nov. 6, 1961, 12,842/61; Jan. 10, 1962, 248/62
1 Claim. (Cl. 260—404.5)

The present invention provides new quaternary ammonium compounds being salts of carboxylic acids of the formula (1) 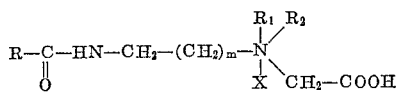

in which R represents an unsaturated linear aliphatic hydrocarbon radical with 11 to 17 carbon atoms, $R_1$ and $R_2$ each represents a methyl, ethyl or hydroxyethyl group, X stands for a halogen atom and $m=1$ or 2.

Thus, the quaternary ammonium compounds of the Formula 1 are derived from tertiary amines of the formula (2) 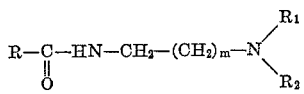

in which R stands for an unsaturated linear aliphatic hydrocarbon radical with 11 to 17 carbon atoms, $R_1$ and $R_2$ may be identical or different and each represents a methyl, ethyl or hydroxyethyl group, and $m=1$ or 2. These bases are as such known; they contain an ethylene radical ($-CH_2-CH_2-$) or a propylene radical ($-CH_2-CH_2-CH_2-$) and a linear unsaturated aliphatic hydrocarbon radical R with 11 to 17 carbon atoms, for example a radical of the formula

The R—CO— radicals need not all be identical, and the diamines may very well be acylated with different unsaturated fatty acid esters. The compounds containing these unsaturated radicals R may comprise a certain proportion of compounds in which said radical R is saturated.

The radicals $R_1$ and $R_2$ present in the compounds of the Formula 2 may be ethyl or β-hydroxyethyl groups, or preferably methyl groups.

The quaternary ammonium compounds of the Formula 1 are further derived from halogenacetic acid and are advantageously obtained by conventional methods from the starting materials referred to above, for example by quaternating a tertiary amine of the formula (3)         X—CH$_2$—COOH in which X stands for a halogen atom such as bromine or preferably chlorine. The salts of the carboxylic acids of the Formula 1 can be prepared by reacting the said acids with bases, for example nitrogenous bases such as triethanolamine. It is of advantage to convert the quaternary compounds of the Formula 1 into salts with a base of the Formula 2.

When the base of the Formula 2 from which the salt is derived and the base of the quaternary compound of the Formula 1 to be used as monocarboxylic acid component are identical, the manufacture of the salts can be simplified in certain respects; thus instead of separately preparing the quaternary ammonium compound of the Formula 1 from 1 molecular proportion of the compound of the Formula 2 and 1 molecular proportion of halogencarboxylic acid and then manufacturing the salt with the use of a further molecular proportion of the base of the Formula 2, 2 molecular proportions of the base of the Formula 2 may be simply reacted with 1 molecular proportion of halogencarboxylic acid.

The salts of the quaternary compounds of the Formula 1 may be used for reducing the electrostatic charge of plastic materials from polyvinylchloride or polyethylene, or of synthetic fibers such as polyamides or polyesters, for example by applying the salts to the fibers from an aqueous bath.

The quaternary compounds of the Formula 1—more especially in the form of salts with the relevant bases—are also very efficient softeners for fibrous materials, above all viscose rayon, and they can be applied to the fibers in the usual manner.

Unless otherwise indicated, parts and percentages in the following examples are by weight.

Example 1

73 parts of oleic acid dimethylaminopropylamide of the formula

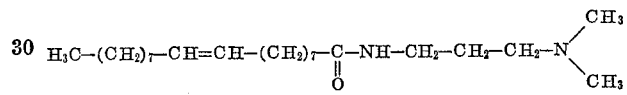

(2 mols) are heated in a reaction vessel equipped with a stirrer to 55 to 60° C. In the course of 30 minutes 9.4 parts of chloracetic acid (1 mol) are added, the air is expelled from the vessel by means of nitrogen, and the batch is heated on for 4 hours at 55 to 60° C. A tough paste is obtained which gives in water a clear solution of neutral reaction and is suitable for softening viscose rayon.

Example 2

Viscose yarn is washed and then treated at a goods-to-liquor ratio of 1:30 for ½ hour at 25° C. with a solution which contains in 1 liter of water 1 to 2 g. of the product obtained as described in Example 1. The yarn is then taken out of the liquor, centrifuged and dried. It has a good, soft handle.

Example 3

A solution of 3 parts of the product obtained from oleylamidopropyl dimethylamine and chloracetic acid in 1000 parts of water is used to pad a polyester fabric which is then expressed to a weight increase of about 80% and dried.

The fabric treated in this manner, which contains about 0.25% of the preparation, displays very good antistatic properties.

Example 4

A polyamide fabric is impregnated in a solution containing per litre of water 2 g. of the reaction product from 2 mols of oleylamidopropyl dimethylamine and 1 mol of chloracetic acid described in Example 1. The fabric is then expressed to a weight increase of 120% and dried. It displays good antistatic properties.

What is claimed is:
The salt composed of the carboxylic acid of the formula
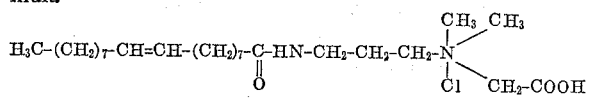
and the base of the formula
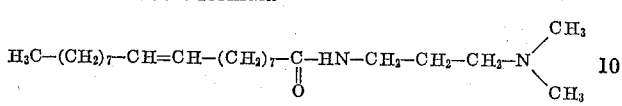
References Cited in the file of this patent
UNITED STATES PATENTS
| | | |
|---|---|---|
| 2,742,464 | Koebner | Apr. 17, 1956 |
| 2,777,872 | Shacklett | Jan. 15, 1957 |
| 2,802,785 | Nowak et al. | Aug. 13, 1957 |
| 2,805,135 | Bell et al. | Sept. 3, 1957 |
| 2,883,370 | Price | Apr. 21, 1959 |
| 2,993,918 | Mannheimer | July 25, 1961 |
FOREIGN PATENTS
| | | |
|---|---|---|
| 559,500 | Germany | June 26, 1928 |